United States Patent [19]

Lange et al.

[11] Patent Number: 5,786,685
[45] Date of Patent: Jul. 28, 1998

[54] ACCURATE HIGH VOLTAGE ENERGY STORAGE AND VOLTAGE LIMITER

[75] Inventors: Gerhard G. Lange, Apalachin; Stephen M. Mott, Vestal, both of N.Y.

[73] Assignee: Lockheed Martin Corporation, Bethesda, Md.

[21] Appl. No.: 783,970

[22] Filed: Jan. 15, 1997

[51] Int. Cl.$^6$ .................. G05F 1/40; H02J 7/00
[52] U.S. Cl. ........................ 323/270; 307/66
[58] Field of Search ............... 323/270; 363/78; 307/66

[56] References Cited

U.S. PATENT DOCUMENTS

| | | | |
|---|---|---|---|
| 4,127,895 | 11/1978 | Krueger | 363/86 |
| 4,709,200 | 11/1987 | Ochini | 320/1 |
| 5,168,436 | 12/1992 | Barlage | 363/21 |
| 5,214,313 | 5/1993 | Windes | 307/109 |
| 5,341,285 | 8/1994 | Wakesfield | 363/97 |
| 5,528,087 | 6/1996 | Sibata et al. | 323/224 |
| 5,532,523 | 7/1996 | Tang | 307/66 |
| 5,532,572 | 7/1996 | Okamura | 320/1 |
| 5,631,814 | 5/1997 | Zak | 363/37 |

FOREIGN PATENT DOCUMENTS

| | | | |
|---|---|---|---|
| 6-205546 | 7/1994 | Japan | H02J 7/34 |
| 1107231 | 2/1982 | U.S.S.R. | H02M 1/14 |

*Primary Examiner*—Stuart N. Hecker
*Attorney, Agent, or Firm*—William H. Steinberg

[57] ABSTRACT

An electronic power supply is adapted to provide uninterrupted power during transients in a voltage input received from a primary power source. The volume of the required storage element is significantly reduced. Adaptations are also made to limit the maximum voltage presented to the voltage converter portion of the electronic power supply by the primary power source. Beneficial adjustment to the turns ratio of the voltage converter transformer and use of lower voltage-rated, more energy efficient power semiconductors result. The voltage levels of the energy storage element and the voltage limiter are very accurate, allowing critical power supply components to be used close to their allowable limits. Density and efficiency of an uninterruptable electronic power supply are both increased.

13 Claims, 4 Drawing Sheets

5,786,685

1

ACCURATE HIGH VOLTAGE ENERGY STORAGE AND VOLTAGE LIMITER

FIELD OF THE INVENTION

This invention relates generally to power supplies, and more specifically to switching power supplies adapted to provide uninterrupted power during transient interruption of its input voltage provided by a primary source. It also specifically relates to switching power supplies that have been adapted to limit the maximum voltage presented to the voltage converter portion of the power supply. The power supply may incorporate either or both adaptations.

BACKGROUND OF THE INVENTION

Electronic equipment often requires a power supply with built in energy storage to allow continued operation during interruption of input voltage from the primary power source or to ensure orderly shutdown of equipment when primary power is removed. In certain military applications, for example, the required holdup period is fifty milliseconds. The volume of the capacitor required for such applications may be significant depending on the power that must be provided during the holdup period.

A desirable attribute of power supplies is minimal volume. The volume of the storage capacitance may be significantly decreased if the stored voltage is increased. Since the energy stored in a capacitor is proportional to the voltage squared, increasing the stored voltage by a factor of two, for example, results in a fourfold increase in stored energy. In addition, if the voltage level is not accurately controlled and/or it changes in an adverse direction as a function of temperature, the energy storage capacitor may have to be increased in size to ensure sufficient energy is stored and capacitor voltage ratings are not exceeded. Since typical energy storage capacitors experience a decrease in capacitance as temperature is reduced, and particularly so as temperatures drop toward −40° C. or less as in many military applications, it would be desirable for the stored voltage to increase with decreasing temperature to compensate for the reduced capacitance.

High power conversion efficiency is another desirable power supply attribute. The requirement of a power supply to provide well-regulated, uninterrupted power despite the presence of severe voltage transients at its input makes high power efficiency difficult to achieve. Typical phase voltage variation for a 115 volt AC nominal generator on a military aircraft may range from 80 to 180 volts AC or more. For a typical power supply, the requirement to maintain regulation throughout the input voltage range imposes the requirement for high voltage semiconductors that are inherently more inefficient and result in lower power efficiency. In terms of power efficiency, the wide transient range also forces non-optimal transformer turns ratios within the power converter(s) so that regulation is maintained over the entire input voltage range. Another drawback of requiring the power converter(s) to regulate throughout the highest voltage portion of the transient range is the greater difficultly presented to design the converter to maintain regulation below the minimum line transient level, for example, below 80 volts AC. It would be desirable to maintain regulation below this minimum level for applications where uninterruptable performance is required. Power converters would be able to draw more energy from the storage capacitor that is part of the power converter leading to further size reduction of the holdup capacitor.

Recent years have seen the emergence of a number of manufacturers of high-density DC-DC converter modules,

2 often referred to as "bricks." Examples of these companies include Vicor, Interpoint, Abbott, and Wilorco. Electrical performance variations include input voltage range, output voltage, output power, and number of outputs. Since these bricks are small and offer a wide selection of performance parameters, with minimal additional passive components such as resistors and capacitors they can be configured to form a nearly complete electronic power supply. Overall power supply volume can be maintained relatively small because of the brick's high-density, cost can be reduced since the bricks are mass-produced, and development time is reduced as less engineering is required.

A complete electronic power supply will typically require other functions beyond those that can be provided by bricks. Often fault detection and interface signals are required. The circuitry that provides these functions requires its own dedicated converter since the power supply's outputs may not be operating due to a fault condition or from being intentionally inhibited. This dedicated converter is sometimes referred to as a "housekeeping" converter or a "bias voltage" converter. It is often realized in the form of a flyback converter, since the flyback is the simplest form of isolated switch-mode DC-DC converter and is well suited for low power and wide input voltage range operation.

Another function often required by an electronic power supply is the ability to provide uninterrupted operation in the presence of transients in its voltage input. This circuitry may insure continued operation of the bricks despite a short term power interruption. It may also limit the voltage presented to the bricks to allow continued operation during a high voltage transient while preventing their damage or degradation.

There are a number of simple methods to provide energy storage that will facilitate continued operation of an electronic power supply when primary power is interrupted. One common method is to incorporate some form of battery backup. In many applications such as in military electronic equipment however, batteries are prohibited primarily due to maintenance issues and to a secondary degree, safety and disposal issues. One or more capacitors such as those produced by Cornell Dubilier Electronics, Inc., Wayne, N.J., offer the next best alternative to serve as the energy storage element. Charge control and discharge activation of these capacitors may be implemented in a number of ways to meet the needs of an uninterruptable power supply.

A typical realization of the prior art is shown in FIG. 1 and as in most cases, involves charging an energy storage capacitor 3 from the primary power source 5 through a series connected charge control circuit 7. Charge control circuit 7 is typically in parallel with an element that serves as a discharge element 11 to the load. Rectifier 13 comprises a single blocking diode in the case of a DC primary power source 5 or a rectifier bridge in the case of an AC primary power source 5. In either case, rectifier 13 will prevent the primary source 5 from discharging the capacitor 3 during a low voltage transient. Some form of charge limiting 17 is generally incorporated to prevent high surge current when primary power is first applied through a switch 15.

The charging circuit may be a simple resistor or a current source such as shown in FIG. 2. The charge current of the current source is determined based upon the voltage across resistor 21. The voltage across resistor 21 is the difference of the zener diode 23 voltage and the gate-source threshold voltage of Field Effect Transistor (FET) 25 during the charging interval. Resistor 27 provides bias current to the gate of FET 25.

Referring again to FIG. 1, during a low line transient rectifier 13 becomes reverse biased and the DC-DC converters are provided with energy from the capacitor 3 through diode 11. Upon restoration of input power, the capacitor 3 is recharged and energy is provided to the DC-DC converters by the primary power source 5. Zener diode 17 limits the voltage to capacitor 3 and is selected typically to limit the voltage to approximately the steady-state voltage level of the primary power source 5 and consistent with capacitor 3 voltage derating requirements. Storage voltage levels that incorporate high-voltage zener diodes 17 such as MIL-S-19500/406A for its control may vary by as much as 13% over their operating temperature range including the initial tolerances. An unfortunate aspect of these zener diodes is their positive temperature coefficient that causes the voltage to increase with temperature, opposite from that desired to compensate for reduced capacitance with decreasing temperatures. The maximum stored voltage that can be guaranteed is the minimum steady-state voltage of the primary power source. Although the prior art is simple, the volume of storage capacitance may be large due to the relatively low stored voltage level that can be achieved.

Barlage U.S. Pat. No. 5,168,436 is illustrative of a power supply that provides uninterrupted power during a short term power removal. This is implemented by providing a power supply with two primary windings for the transformer, and two associated switches operable to modulate current flow through the primary windings. One switch is regulated in a conventional manner during normal operation to enable and modulate current flow from a relatively low-voltage power source through the primary winding associated with that switch. A second switch is connected through the second primary winding to a relatively high-voltage capacitor, but is regulated to disable current flow from the capacitor through the winding during normal operation, and to enable and modulate the same during the holdup period. Barlage's invention provides a substantially glitch-free transfer from normal operation to holdup mode. Shortcomings of this method include greater complexity of the power supply transformer and no provision for high voltage limiting. Control of the storage capacitor voltage is not particularly accurate, requiring larger capacitor volume to ensure sufficient energy storage and remaining within capacitor voltage rating. There are also no apparent provisions for charging to higher voltage levels at low temperatures to compensate for reduced capacitance.

Other methods of reducing energy storage capacitor volume are based on extracting more energy from the capacitor. This may be implemented by interposing a second converter between the energy storage capacitor and the main power converter. The combined converters can maintain performance to a lower capacitor voltage and therefore more energy is extracted. Windes U.S. Pat. No. 5,214,313 illustrates a method that allows the energy storage capacitors to discharge down to a much lower voltage than would be possible if they were used to drive the load directly. This is accomplished by inserting a voltage regulator ahead of an inverter which is connected to the load. Lange et al U.S. Pat. No. 5,179,508 present a method whereby a "Standby Boost Converter" is combined with any type DC-DC converter to obtain an overall more efficient power supply and means by which more energy may be extracted from an energy storage capacitor. Windes' and Lange's methods are effective, however, they may not achieve the energy storage capacitor volume reductions that other methods storing voltages higher than maximum steady-state input voltage levels realize. No provisions are made for limiting maximum voltage presented to the power converters.

Several methods exist for limiting maximum voltage to a load such as DC-DC converters from a primary power source. This may be as simple as including a damped low-pass filter composed of resistors, inductors, and capacitors between the power source and load. This method does not provide accurate control of peak voltage, is very dependent on the duration of the transient, may impact stability, and may also require relatively large volume to implement. Semiconductor transient absorption devices such as metal oxide varistors (MOVs), although they exhibit very fast response times, do not accurately limit their peak voltages and performance is dependent upon the impedance of the primary power source. MOV's must be carefully selected to insure sufficient energy absorption capability to limit the worst case transients. Limiters based upon high voltage zener diodes suffer the same inaccuracies as discussed earlier for the energy storage capacitor voltage limiters.

It is an object of the present invention to provide a power supply that can deliver well-regulated, uninterrupted output voltages over a wide temperature range to a load when supplied from an input source having momentary voltage interruptions, while achieving a minimum volume of energy storage capacitance.

It is another object of the present invention to provide a power supply that can deliver well-regulated, uninterrupted output voltages to a load from an input source having wide transient variations while achieving overall power efficiency improvement.

It is yet another object of the present invention to provide a power supply that can deliver well-regulated, uninterrupted output voltages to a load from an input source having wide transient variations that is suitable for use with mass-produced high-density DC-DC converter modules.

It is still another object of the present invention to provide a power supply that can deliver well-regulated, uninterrupted output voltages to a load from an input source having wide transient variations by making effective use of an already existing housekeeping converter. No additional storage capacitor charging converter is required nor are significant changes to the housekeeping converter required.

It is another object of this invention to provide a means of accurately limiting maximum voltage presented to a load such as a DC-DC converter that is not dependent upon the primary power source impedance.

SUMMARY OF THE INVENTION

In one aspect of the present invention, six circuit functions are provided: a high voltage reference, holdup capacitor charger, input voltage transient limiter, energy transfer switch, high voltage bias provided by flyback converter, and holdup capacitor. The high voltage reference establishes an accurate, temperature-compensated charge limit for the holdup capacitor and a maximum voltage limit for the input voltage transient limiter. The holdup capacitor charger provides a voltage and current limited source to charge the holdup capacitor. The current limit for two distinct charge intervals may be set. Initially, holdup capacitor is charged to the input line voltage at a current not to exceed the allowable inrush current or the power limitation of a pass element. Completion of capacitor charge to levels determined by high voltage reference is set by source capability of high voltage bias. The input voltage transient limiter contains a pass element connecting the input line voltage to the conditioned power bus loaded with DC-DC converters, for example. This pass element normally in a saturated state becomes active at a voltage level determined by the high voltage reference to limit the voltage to the load on power bus during high input voltage transients. During a power interruption, energy transfer switch connects the holdup capacitors to the conditioned power bus. High voltage bias is obtained from an internal housekeeping supply and provides high voltage bias to the aforementioned circuits.

A means by which a power supply may be adapted to provide uninterrupted power during transients in its input voltage and limit the maximum voltage presented to the DC-DC converter portion of the power supply is provided. It makes effective use of an already present housekeeping supply, typically realized in the form of a flyback converter. This invention requires no additional windings to the transformer, makes use of otherwise wasted transformer leakage energy, and allows for more efficient design of the flyback converter since its maximum input voltage is also limited. The more efficient design of the flyback converter is made possible by the narrower input voltage range over which the converter is required to operate, allowing advantageous adjustment of the flyback converter transformer turns ratio. Since the energy storage capacitor stores accurately-controlled, adjustable, relatively high voltage, that tends to increase with decreasing temperature, capacitor volume can be minimized. Since there is provision to limit the maximum voltage seen by the DC-DC converters, these converters may be designed to operate more efficiently and/or designed to operate down to a lower input voltage level thereby enabling more energy to be extracted from the energy storage capacitors, facilitating further capacitor volume reduction. Alternatively, this invention can allow the use of lower-cost bricks with narrower input voltage range to configure an uninterruptable electronic power supply. This has become more important recently as the military seeks commercial-off-the shelf (COTS) low-cost solutions to their power needs.

BRIEF DESCRIPTION OF DRAWINGS

The nature of the invention, as well as other objects and advantages thereof will become more apparent to those skilled in the art after considering the following detailed description in connection with accompanying drawings in which like reference numerals indicate like elements throughout, wherein.

DETAILED DESCRIPTION OF THE PREFERRED EMBODIMENT

Figure 1:
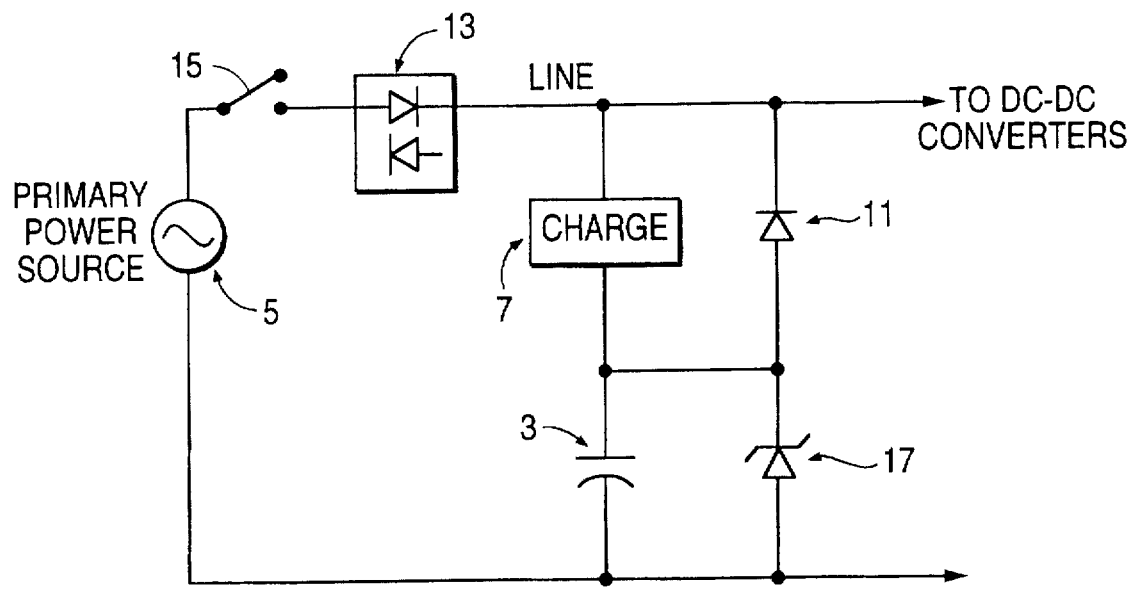
FIG. 1 is an electrical schematic of an example of the prior art illustrating an energy storage circuit that is charged directly from the line voltage.
Figure 2:
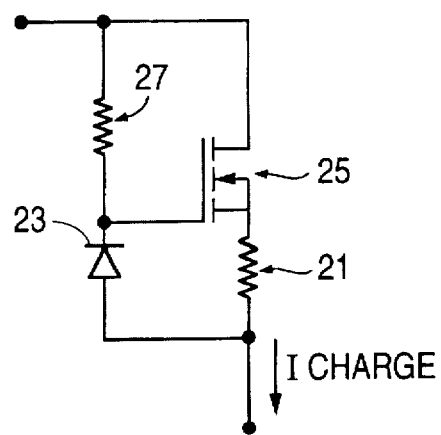
FIG. 2 is an electrical schematic of an example of the prior art illustrating a current source charge control circuit.

Referring now to the drawing, and more particularly FIG. 3 thereof, six major functions are schematically illustrated: the high voltage reference 31, the holdup capacitor charger 33, the transient voltage limiter 35, the energy transfer switch 37, the flyback converter 41 generating the high voltage bias 65 and the holdup capacitor 43. The functions receive input power from an input power source 51 and develop conditioned power at bus 45.

Input power source 51 is connected to input voltage bus 53 that provides power to the input transient voltage limiter 35. Input voltage limiter 35 includes a diode 47, having its anode connected to input power source 51 via input voltage bus 53 and its cathode connected through a resistor 55 to the gate of a pass element shown as an n-channel MOSFET 57. The cathode of diode 47 is also connected to the drain of MOSFET 57. A diode 61 has its anode connected to the gate of MOSFET 57 and its cathode connected to the cathode of a zener diode 63. The anode of zener diode 63 is connected to the source of MOSFET 57 and conditioned power bus 45. The input transient voltage limiter 35 has the gate of MOSFET 57 connected to a high voltage bias supply 65 through a series connected resistor 67 and diode 71, with the anode of diode 71 connected to the high voltage bias supply 65 and the cathode of diode 71 connected to resistor 67. The input transient voltage limiter 35 also includes a zener diode 73 having its cathode connected to the gate of MOSFET 57 and its anode connected to the anode of blocking diode 75.

The high voltage reference 31 is connected to the high voltage bias supply 65 through a diode 77. The anode of diode 77 is connected to high voltage bias supply 65 and the cathode is connected to the collector of npn transistor 81. Connected between the collector and base of transistor 81 is a current regulator diode 107, with the cathode of current regulator diode 107 connected to the base of transistor 81. The emitter of transistor 81 is connected through series connected variable resistor 83 and resistor 85 to ground. The base of a pnp transistor 87 is connected to the junction of variable resistor 83 and resistor 85. The base of transistor 81 and the emitter of transistor 87 are connected through series connected diode 91 and zener diode 93. Although only one diode 91 is shown, several diodes can be connected in series to increase the amount of temperature compensation as required. The anode of diode 91 is connected to the base of transistor 81 and the anode of zener diode 93 is connected to the emitter of transistor 87. The collector of transistor 87 is connected to ground through series connected resistor 95 and zener diode 97. The anode of zener diode 97 is connected to ground.

The holdup capacitor charger 33 includes a diode 101 having its cathode connected to the emitter of transistor 87 and the cathode of blocking diode 75. The anode of diode 101 is connected to the gate of a pass element shown as an n-channel MOSFET 103. A diode 105 has its anode connected to the conditioned power bus 45 and its cathode connected to the drain of MOSFET 103. The cathode of diode 105 is also connected through a resistor 106 to the anode of a current regulator diode 107 and through a resistor 111 to the gate of MOSFET 103. The source of MOSFET 103 is connected through a resistor 113 to the anode of a blocking diode 115. The anode of diode 115 is also connected to the anode of zener diode 117. The cathode of zener diode 117 is connected to the gate of MOSFET 103. The cathode of blocking diode 115 is connected to the positive plate of holdup capacitor 43. The negative plate of holdup capacitor 43 is connected to ground. While one holdup capacitor is shown, several series connected or parallel capacitors may be used to obtain the desired voltage rating or capacitance.

Energy transfer switch 37 has the anode of a diode 121 connected to the positive plate of holdup capacitor 43. The cathode of diode 121 is connected through a switch shown as an n-channel MOSFET 123 to the conditioned power bus 45. The conditioned power bus provides uninterrupted power during transients in voltage in the input power source 51 to a load 181, that may be a switching power converter or other load requiring uninterrupted power during transients in the primary power supply. The drain of MOSFET 123 is connected to the cathode of diode 121 and the source of MOSFET 123 is connected to the conditioned power bus 45. A drive circuit 125 that senses the voltage at input voltage bus 53 and is connected to the base of npn transistor 127, is shown in more detail in FIG. 4. High voltage bias supply 65 is connected through a resistor 131 to the base of transistor 127 and is connected through a resistor 133 to the collector of transistor 127. A zener diode 135 is connected across the collector and emitter of transistor 127, with the anode connected to the emitter. The collector of transistor 127 is connected to the gate of MOSFET 123.

A flyback converter 41 has a switch shown as an n-channel MOSFET 137, having its drain connected in series with the undotted side of the primary winding of a transformer 141. The source of MOSFET 137 is connected to ground and the gate is driven by a current mode pwm controller 143. The dotted end of the primary winding of transformer 141 is connected to the conditioned power bus 45. The drain of MOSFET 137 is connected to the anode of diode 145 and a cathode 145 to the high voltage bias supply 65. A capacitor 147 is connected between the conditioned power bus 45 and the high voltage bias supply 65. The secondary of transformer 141 has the dotted end of the secondary winding connected to ground and the undotted end of the secondary winding connected to the anode of a diode 151. The anode of diode 151 is connected to the regulated output voltage of the flyback converter 153. A capacitor 155 is connected between the cathode of the diode 151 and ground.

Figure 4:
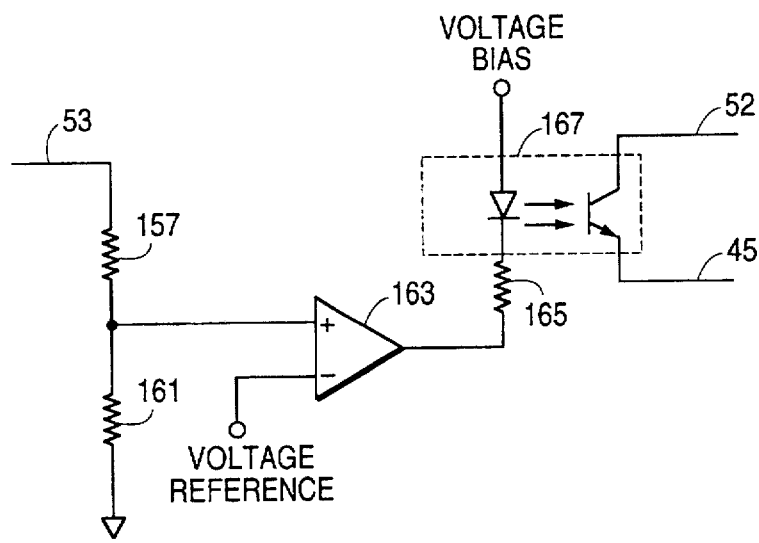
FIG. 4 is an electrical schematic of a typical implementation of input voltage sense and required drive for the energy transfer function.

Referring now to FIG. 4, an implementation of the driver 125 is shown. Resistors 157 and 161 are connected in series between the input voltage bus 53 and ground. The noninverting input of a comparator 163 is connected to the junction of resistors 157 and 161. The inverting input of the comparator is connected to a voltage reference. The output of the comparator 163 is connected through a resistor 165 to the LED emitter portion of an opto-coupler 167 to a bias voltage. The photodetector portion of the opto-coupler is connected between the base of transistor 127 and the conditioned power bus 45.

Figure 5:
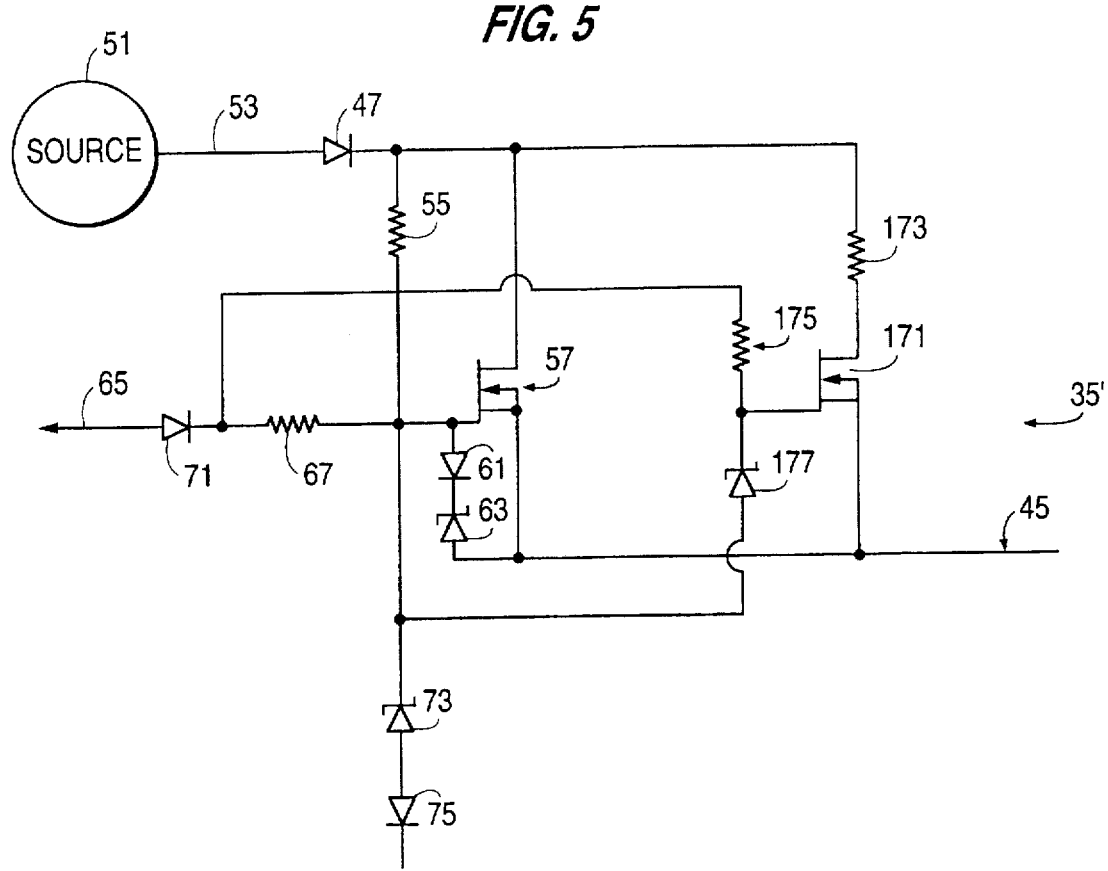
FIG. 5 is an electrical schematic illustrating modification of the input voltage transient limiter to increase its power handling capability.

Referring now to FIG. 5, an alternative embodiment of the input voltage transient limiter 35 is shown as input voltage transient limiter 35'. Input power source 51 is connected to input voltage bus 53 that provides power to the input transient voltage limiter 35'. Input voltage limiter 35' includes a diode 47, having its anode connected to input power source 51 via input voltage bus 53 and its cathode connected to the drain of an n-channel MOSFET 57. The input transient voltage limiter has the gate of MOSFET 57 connected to a high voltage bias supply 65 through a series connected resistor 67 and diode 71, with the anode of diode 71 connected to the high voltage bias supply and the cathode of diode 71 connected to resistor 67. A diode 61 has its anode connected to the gate of MOSFET 57 and its cathode connected to the cathode of a zener diode 63. The input transient voltage limiter 35' also includes a zener diode 73 having its cathode connected to the gate of MOSFET 57 and its anode connected to the gate of blocking diode 75. A second FET in the input voltage transient limiter 35', shown as an n-channel MOSFET 171, has its drain connected through a power resistor 173 to the drain of MOSFET 57. The gate of MOSFET 171 is connected to one end of resistor 175. The other end of resistor 175 is connected to the junction of diode 71 and resistor 67. The cathode of zener diode 177 is also connected to the gate of MOSFET 171. The anode of zener diode 177 is connected to the cathode of zener diode 73. The source of MOSFET 171 is connected to the source of MOSFET 57 and the conditioned power bus 45.

Figure 3A:
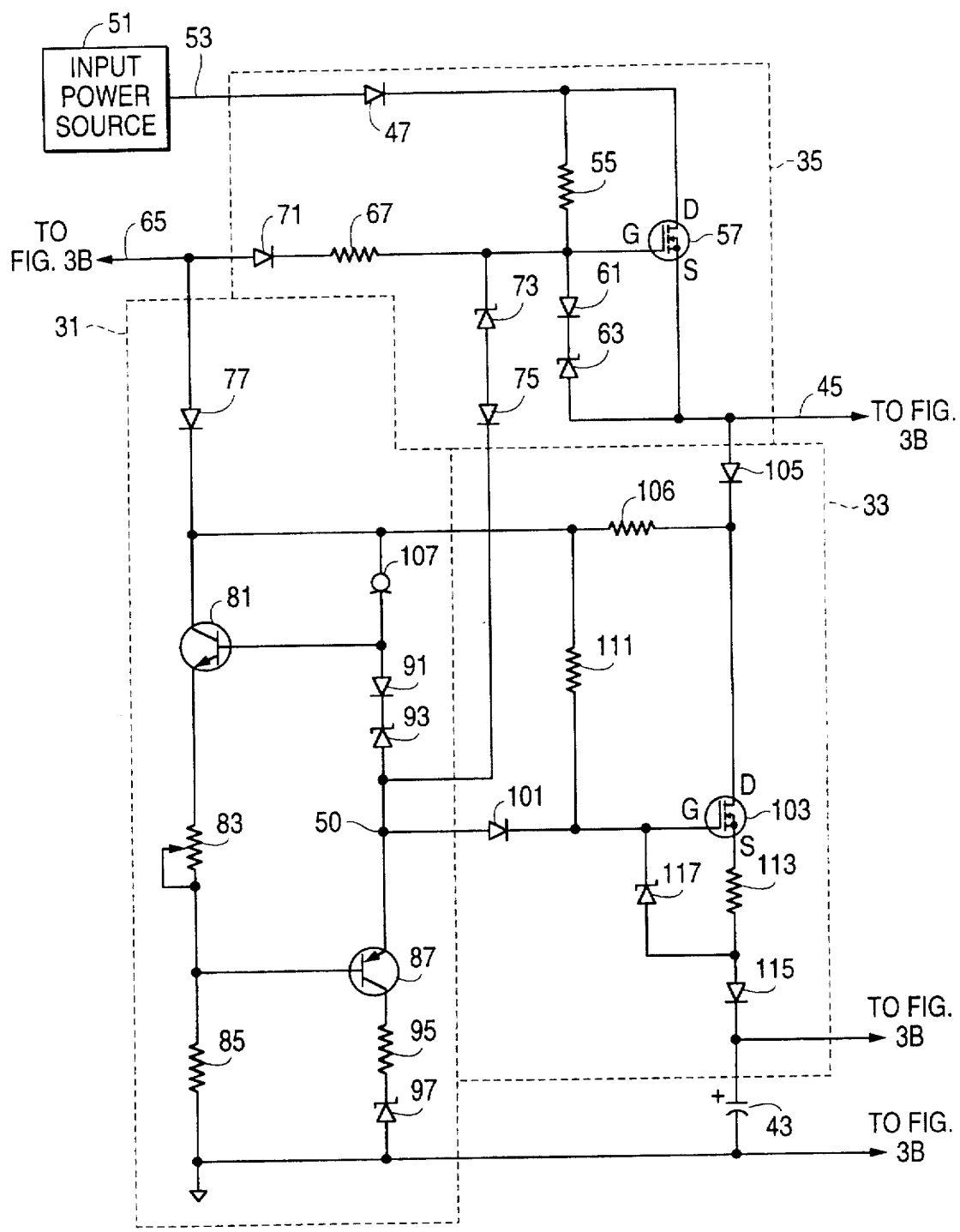
FIGS. 3A and 3B are an electrical schematic diagram of the uninterruptable power supply according to the preferred embodiment of the present invention.
Figure 3B:
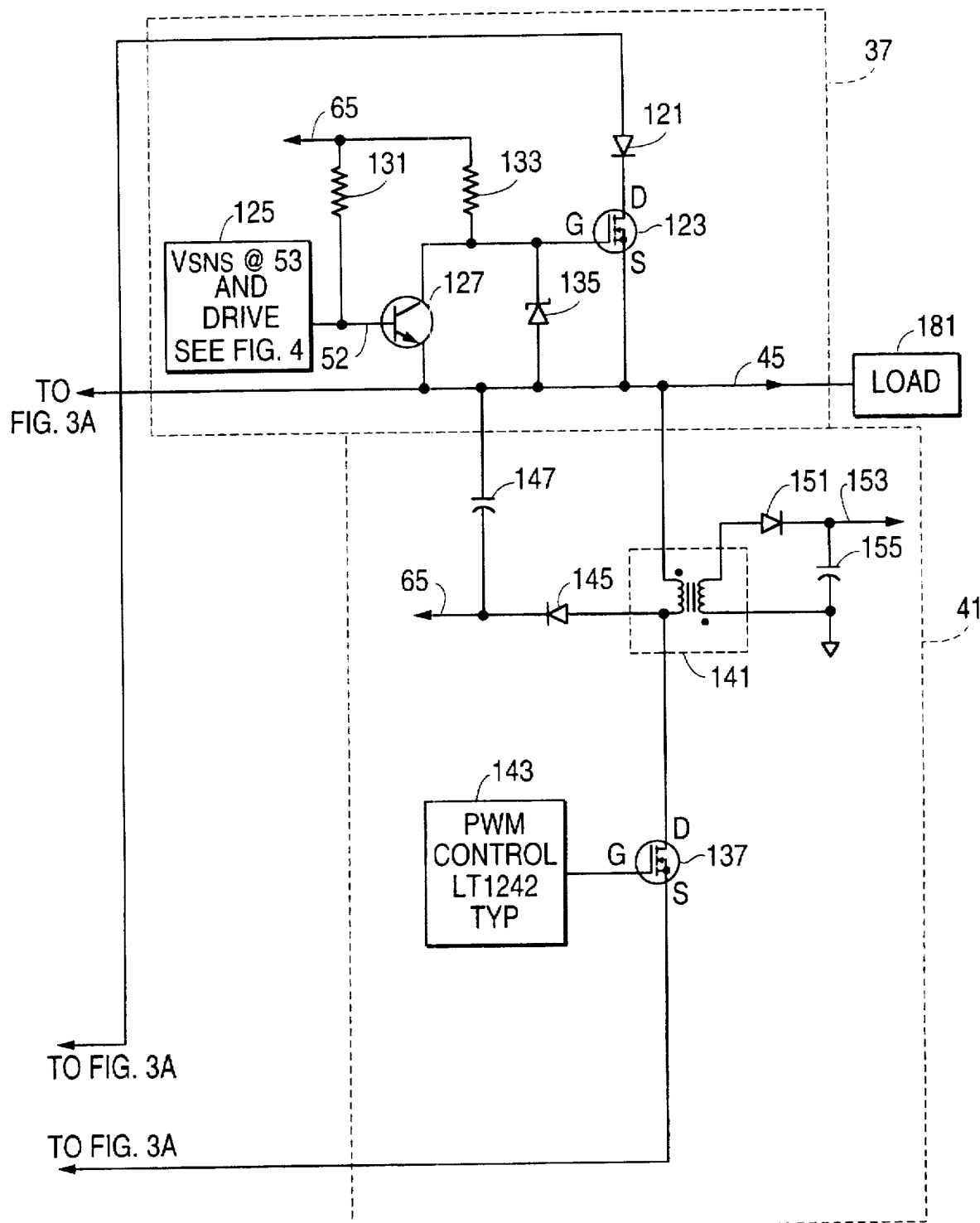

The operation of FIGS. 3A and 3B is as follows, the high voltage reference 31 utilizes high voltage bias 65 developed from flyback converter 41. Current regulator diode 107 establishes a constant current in temperature compensated zener diode 93 developing a stable voltage across the zener diode 93. The base of transistor 81 requires relatively little current due to its high gain. Variations of zener diode current with temperature are relatively small. The sum of the voltages across zener diode 93 and diode(s) 91 is impressed across variable resistor 83. The base-emitter voltages of transistors 81 and 87 offset one another over temperature. Diodes 107, 91, 93, transistors 81, 87, and variable resistor 83 in effect form a current source delivering current through resistor 85. The current provided by the current source will vary with temperature determined by the sum of the voltage drops across diodes 93 and 91. Since transistor 87 is high gain, its base will supply relatively small current compared with that of the current source resulting in a voltage across resistor 85 that will track the current provided by the current source. The high voltage reference is taken from the emitter follower connected transistor 87 at node 50 that serves to buffer the reference from its loads 33 and 35. Favorable temperature variation of the reference is provided by the temperature coefficient of diode(s) 91. As temperature decreases, the forward voltage of diode(s) 91 increases, resulting in increased current from the current source, higher voltage across resistor 85 and higher reference voltage at node 50. This takes advantage of the capacitor's 43 ability to support higher voltage at colder temperature. Variable resistor 83 may be adjusted to trim out initial circuit tolerances. Resistor 95 and zener diode 97 reduce the voltage across the collector-emitter of transistor 87 and compensate for variations in load current in the path of diode 101. Resistor 95 and zener diode 97 also reduce power dissipation experienced by transistor 87 by reducing the voltage across its collector-emitter terminals. The necessity of resistor 95 and zener diode 97 is dependent upon the particular application.

The input transient voltage limiter 35 consists of pass element 57 operating in a saturated state under nominal input conditions. Its gate voltage is provided by the high voltage bias circuit 65 via diode 71 and resistor 67. Upon application of input source 51, prior to establishment of high voltage bias 65, gate voltage is provided via resistor 55. The voltage on conditioned power bus 45 is limited by zener diode 73 and blocking diode 75 establishing a clamp level at the gate of FET 57. The clamp level is approximately the sum of the high voltage reference at node 50 and voltage across diodes 73 and 75 minus the gate-source threshold voltage of FET 57. Zener diode 73 is provided since the input voltage clamp level on power bus 45 will typically be set higher than the voltage on the holdup capacitor 43. As power source 51 rises above this clamp level, FET 57 will transition to a linear state absorbing the transient energy and thereby limiting the maximum voltage seen on conditioned power bus 45. Care must be taken to remain within the safe operating area (SOA) of FET 57. FIG. 5 illustrates one method in which the power absorption capability of the transient voltage limiter may be increased. Diodes 61 and 63 limit the gate-source voltage of FET 57 to within its ratings during normal operation.

The holdup capacitor charger 33 sets two different rates of charge for holdup capacitor 43. At application of input power source 51, the majority of charge current is via FET 57 and diode 105 and is limited by a current source formed by FET 103, resistors 113 and 111 and zener diode 117, much as described in the prior art. Current is limited so as not to exceed specified inrush current limitations or SOA of the FET 103. When holdup capacitor 43 reaches the voltage level of the input power source, the charge rate via diode 77 is further limited by resistor 106 to within the capability of the high voltage bias 65. With the gate of pass element FET 103 clamped to the high voltage reference, as the holdup capacitor 43 approaches this level the pass element will be choked off limiting the charge current. Resistor 111 provides gate voltage for FET 103 while zener diode 117 limits gate-source voltage during the charging interval. Blocking diode 115 prevents holdup capacitor 43 from discharging into charger or reference circuits.

The energy transfer function 37 utilizes FET 123 as a switch to connect the holdup capacitor 43 to the conditioned power bus 45 when it is sensed the input power source 51 is falling below an acceptable limit. Bias for this function is provided by high voltage bias supply 65. The input voltage bus 53 is sensed for voltage drops below minimum steady-state limits and this information is used to drive the base of transistor 127. Typical implementation of this sense circuit is contained in FIG. 4. Note that drive for transistor 127 must be referenced to conditioned power bus 45. As shown in FIG. 4, this is realized with an opto-coupler 167. Diode 121 prevents current flow from conditioned power bus 45 through the body diode of FET 123 prior to complete charge of holdup capacitor 43. Zener diode 135 limits gate-source voltage applied to FET 123.

The high voltage bias 65 is derived from an existing flyback housekeeping supply 41. Detailed discussion of flyback converter 41 will not be undertaken since its operation is standard and well documented. Turns ratio of flyback transformer 141 and regulated output voltage 153 determine the magnitude of the high voltage bias. The high voltage bias is typically 20–50% greater than the nominal input power supply 51 voltage. Flyback control 143 is maintained by current mode PWM controller, such as Linear Technology LT1242.

Table 1 contains numerical estimates of performance to understand the type of energy storage volume reductions that may be realized. Three cases are considered where a fixed holdup time is required over a wide temperature range. Capacitor volume is considered to be approximately proportional to the product of capacitance and the capacitor rated voltage. In each case, the DC-DC converters are assumed capable of operating down to 125 volts DC. The capacitor considered has a capacitance 3200 microfarads nominal at room temperature and a capacitance reduced by 20% at cold temperatures. The required capacitor voltage derating is 0.7 times the rated voltage. Case 1 describes a prior art off-the-line energy storage capacitor charger. The capacitor is rated at 350 volts and therefore is derated to 245 volts that establishes the highest acceptable nominal initial capacitor voltage allowed. It is assumed that the voltage is controlled to within 13% by a high voltage zener. The guaranteed energy that can be provided is approximately 38.2 Joules. The nominal capacitor-voltage (CV) product is 1.12 volt-farads. Case 2 describes a high voltage storage that is again controlled by a 13% zener. The capacitor is rated at 500 volts and therefore is derated to 350 volts that again establishes the acceptable nominal initial capacitor voltage. To guarantee that the same amount of usable energy is stored as in Case 1, the nominal capacitance must be 1240 microfarads yielding a CV product of 0.62 volt-farads. Case 3 describes the preferred embodiment of this invention that incorporates an accurate high voltage reference and a 500 volt capacitor. The reference is designed to increase the capacitor voltage by 10% when the temperature is at a minimum. In this case, the required capacitance to guarantee 38.2 Joules is 720 microfarads yielding a CV product of 0.36 volt-farads. The following table summarizes the results. Significant reduction in capacitor volume is realized by storing higher voltage and further significant gains are realized by incorporating an accurate, temperature compensating voltage reference to limit voltage on the storage capacitor.

TABLE 1

| Case | Description | Nom. Cap | Voltage Rating | CV Product | % Change in volume from previous case |
|------|-------------|----------|----------------|------------|---------------------------------------|
| I | Off-line charge Inaccurate limiter | 3200 μF | 350 V | 1.12 V-F | not applicable |
| II | High voltage charge Inaccurate limiter | 1240 μF | 500 V | 0.62 V-F | −44.6 % |
| III | High voltage charge Accurate, temperature-correcting limiter | 720 μF | 500 V | 0.36 V-F | −42.0 % |

There are various changes in form and detail that may be made to the preferred embodiment of the present invention. For those skilled in the art, it will be understood that the high voltage bias may be generated from any converter which makes available from its transformer elements a voltage that is substantially higher than the nominal input voltage from the primary power source. This converter is not required to be the housekeeping circuit but instead may be a DC-DC converter producing the power supply outputs.

The high voltage reference may be modified in other ways to provide the desired performance with temperature. The preferred embodiment demonstrated a means where the temperature performance was controlled by means of diodes 91 and 93. Alternative methods to achieve temperature performance may be through the use of a network of fixed and temperature dependent resistors such as are commonly known as thermistors. Since the values of resistors 83 and 85 strongly determine the reference voltage, their location would provide suitable places to incorporate thermistor-based networks.

It is also understood that one may elect not to take advantage of the preferred embodiment of the high voltage reference. The voltage limiter of the prior art may be used in its place or a reference based upon a precision programmable reference such as a TL431 from Texas Instruments. Data books and application notes illustrate a variety of regulators and current sinks which may be useful for energy storage capacitor voltage limiting and charge control.

The input voltage transient limiter may be modified to increase its power absorption capability. When approaching SOA limitations of FET 57, due to increased loading on conditioned power bus 45, a second FET 171 with power resistor 173 may be added as shown in FIG. 5. Resistors 175 and 173, FET 171 and zener diode 177 have been added to the previous embodiment. For heavy current loading on conditioned power bus 45, FET 57 limits the voltage as previously described. FET 171 is in a saturated state as its gate is being driven via resistor 175 and limited in voltage by zener 177 to a level below FET 171 gate-source breakdown voltage level. Since FET 171 is saturated, high power resistor 173 is in parallel with FET 57 reducing its dissipated power and increasing the overall dissipation capability of the limiter. For lighter current loading on conditioned power bus 45, FET 57 can no longer limit the voltage since the current provided via FET 171 and resistor 173 is greater than that required by the load. The maximum conditioned power bus 45 voltage increases by the amount of the zener 177 voltage limited by FET 171 in the same manner as discussed earlier. The crossover between the operation of the FETs 57 and 171 may be approximately determined by when the load current drawn on conditioned power bus 45 is equal to the current determined by resistor 173 and the difference of the voltage at input voltage bus 53 and the maximum limit on conditioned power bus 45.

It is also understood that one may choose not to include the transient voltage limitation feature 35 of this invention. None of the remaining five circuit functions are dependent on this feature. In situations where the input power source is well behaved this circuit may not be required. Alternatively, the voltage transient limiter 35 feature may be implemented without the need for holdup capacitor charger 33 and capacitor 43.

The foregoing has described a power supply that can deliver well-regulated, uninterrupted output voltages over a wide temperature range to a load when supplied from an input source having momentary voltage interruptions, while achieving a minimum volume of energy storage capacitance.

While the invention has been particularly shown and described with reference to several embodiments thereof, it will be understood by those skilled in the art that various changes in form and details may be made therein without departing from the spirit and scope of the invention.

What we claim is:

1. An electronic power supply for supplying uninterrupted power during transients to a load, said electronic power supply connectable to a primary power source, said electronic power supply comprising:
   a high voltage bias supply for providing a voltage greater than the nominal voltage of the primary power source;
   a holdup capacitor;
   a high voltage reference connectable to said high voltage bias supply for setting a maximum voltage limit for said holding capacitor and the load;
   a holdup capacitor charger connected to said holdup capacitor for charging said holdup capacitor;
   an energy transfer switch for supplying energy to the load from said holdup capacitor when the primary power source voltage is below a first predetermined value; and
   a transient voltage limiter including a pass transistor, said pass transistor transitioning from a saturated to an active state when a primary power source voltage is above a second predetermined value provided by said high voltage reference thereby limiting the maximum voltage supplied to said load.

2. The electronic power supply of claim 1, wherein said high voltage bias supply is obtained from a housekeeping supply.

3. An electronic power supply for supplying voltage limited power to a load, said electronic power supply connectable to a primary power source, said electronic power supply comprising:
   a high voltage bias supply for providing a voltage greater than the nominal voltage of the primary power source;
   a high voltage reference connectable to said high voltage bias supply for setting a maximum voltage limit for a holding capacitor and the load, said high voltage reference circuit comprising a first resistor, and temperature compensated current source feeding said first resistor: and
   a transient voltage limiter including a pass transistor, said pass transistor transitioning from a saturated to an active state when a primary power source voltage is above a second predetermined value supplied by said high voltage reference, thereby limiting the maximum voltage supplied to said load.

4. The electronic power supply of claim 3 wherein said temperature compensated current source comprises a first and second emitter follower connected transistors of opposite polarities, a low voltage reference with a voltage lower that said high voltage reference coupled between the base of the first transistor and the emitter of the second transistor, and a second resistor coupled between the emitter of the first transistor and the base of the second transistor, whereby the voltage drop across the low voltage reference is impressed across the second resistor, generating a temperature compensated current in the second resistor and generating a temperature compensated voltage across the first resistor, the high voltage reference being available at the output of the second transistor.

5. The electronic power supply of claim 4 where in said low voltage reference comprises a diode.

6. The electronic power supply of claim 4 where in said low voltage reference comprises a zener diode.

7. The electronic power supply of claim 4 where in said low voltage reference comprises a zener diode in series with a diode.

8. An electronic power supply for supplying uninterrupted power during transients to a load, said electronic power supply connectable to a primary power source, said electronic power supply comprising:
   a holdup capacitor;
   a first voltage reference connectable to said primary power source for setting a maximum voltage limit for said holding capacitor, said first voltage reference comprising a first resistor, and temperature compensated current source feeding said first resistor, said first voltage reference including a current source supplying a first resistor; and
   a holdup capacitor charger connected to said holdup capacitor for charging said holdup capacitor.

9. The electronic power supply of claim 8 wherein said temperature compensated current source comprises a first and second emitter follower connected transistors of opposite polarities, a second voltage reference having a voltage lower that the first voltage reference and coupled between the base of the first transistor and the emitter of the second transistor, and a second resistor coupled between the emitter of the first transistor and the base of the second transistor, whereby the voltage drop across the second voltage reference is impressed across the second resistor, generating a temperature compensated current in the second resistor and generating a temperature compensated voltage across the first resistor, the first voltage reference being available at the output of the second transistor.

10. The electronic power supply of claim 9 where in said second voltage reference comprises a diode.

11. The electronic power supply of claim 9 where in said second voltage reference comprises a zener diode.

12. The electronic power supply of claim 9 where in said second voltage reference comprises a zener diode in series with a diode.

13. An electronic power supply for supplying uninterrupted power during transients to a load, said electronic power supply connectable to a primary power source, said electronic power supply comprising:

a high voltage bias supply for providing a voltage greater than the nominal voltage of the primary power source;

a holdup capacitor;

a high voltage reference connectable to said high voltage bias supply for setting a maximum voltage limit for said holding capacitor;

a holdup capacitor charger connected to said holdup capacitor for charging said holdup capacitor; and an energy transfer switch for supplying energy to the load from said holdup capacitor when the primary power source voltage is below a predetermined value.

* * * * *

UNITED STATES PATENT AND TRADEMARK OFFICE
CERTIFICATE OF CORRECTION

PATENT NO. : 5,786,685
DATED : July 28, 1998
INVENTOR(S) : Gerbard G. Lange, Stephen M. Mott It is certified that error appears in the above-identified patent and that said Letters Patent is hereby corrected as shown below:

Title page,
Item [75], should read -- Gerhard G. Lange --.

Signed and Sealed this

Thirteenth Day of November, 2001

Attest:

NICHOLAS P. GODICI
Attesting Officer    Acting Director of the United States Patent and Trademark Office